Dec. 7, 1971  F. RUSSO ET AL  3,625,106
PARACHUTE DEPLOYMENT SAFETY APPARATUS
Filed Feb. 26, 1970  2 Sheets-Sheet 2

INVENTOR.
FRANK RUSSO
BY
*George J. Rubens*
ATTORNEYS

United States Patent Office

3,625,106
Patented Dec. 7, 1971

---

3,625,106
PARACHUTE DEPLOYMENT SAFETY APPARATUS
Frank Russo, 4008 Ridge Road, Annandale, Va. 22003,
and Robert J. Scire, 1308 Michael Lane, Hixson, Tenn. 37343
Filed Feb. 26, 1970, Ser. No. 14,322
Int. Cl. B64d 1/04
U.S. Cl. 89—1.5 D    4 Claims

ABSTRACT OF THE DISCLOSURE

In combination with an aircraft-launched armament device having a parachute, a safety valve apparatus for preventing inadvertent release and deployment of the parachute during ground handling, or carrier catapults and landings that may otherwise cause personnel injuries and damage to stores and aircraft.

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates to a system for aircraft-launched armament stores employing a parachute, and more particularly to such a system having a safety device to prevent inadvertent deployment of said parachute.

The military services employ aircraft for dropping certain types of practice bombs which provide the option of deployment of a parachute under prescribed operational conditions. When the pilot desires to intentionally drop the bomb with parachute deployment he throws an arming switch in the cockpit, and after the bomb falls a predetermined distance from the bomb rack the parachute is automatically ejected from the bomb container by an explosive initiator.

In the existing bomb arrangements, the potential exists for the inadvertent deployment of the parachute in the event the bomb should accidentally fall off the bomb rack during ground handling, aircraft taxiing, a catapult launching or landing, or "hang-up" on a defective bomb rack. Similarly, the firing cable to the initiator can be pulled by someone "skylarking" or through curiousity, causing parachute ejection with possible inpuries to personnel in the vicinity as well as damage to stores and aircraft.

SUMMARY OF THE INVENTION

The present invention incorporates a safety device in the bomb assembly that prevents the inadvertent deployment of the parachute and likelihood of damage to personnel and equipment resulting therefrom. In the preferred embodiment the safety device is a fluid valve interposed through suitable piping between the explosive initiator and the parachute ejection cartridge. The explosive initiator is controlled by a firing cable attached to the bomb rack. The safety valve is normally locked in a SAFE or UNARMED condition where it vents the gas from an accidentally discharged initiator to the atmosphere. Thus, the initiator gas is harmlessly by-passed that would otherwise be admitted to the parachute ejection cartridge to initiate deployment of the parachute.

The safety valve is spring-loaded to an ARMED position. An arming wire, controlled by the pilot through a solenoid, locks the valve in the SAFE position and maintains the valve spring compressed. If the arming wire is caused to be withdrawn from the valve by the pilot, the valve is freed to be spring actuated to the ARMED position where it routes the initiator gas to the ejector cartridge for parachute deployment. If for any reason the arming wire is not intentionally withdrawn from the valve, the valve will remain in a SAFE condition and any accidental operation of the firing cable and the explosive initiator will cause the gas to be harmlessly by-passed and vented to atmosphere to prevent deployment of the parachute.

STATEMENT OF THE OBJECTS OF THE INVENTION

A principal object of the invention is to provide a safety device for a droppable armament device having a parachute system to prevent inadvertent deployment of the parachute system that may cause injury to personnel and damage to equipment.

A further object of the invention is to provide such a safety device that can be incorporated into existing armament devices without extensive modification and at a minimum cost.

Other objects, advantages and novel features of the invention will become apparent from the following detailed description of the invention when considered in conjunction with the accompanying drawings.

DESCRIPTION OF THE PREFERRED EMBODIMENT

Figure 1:
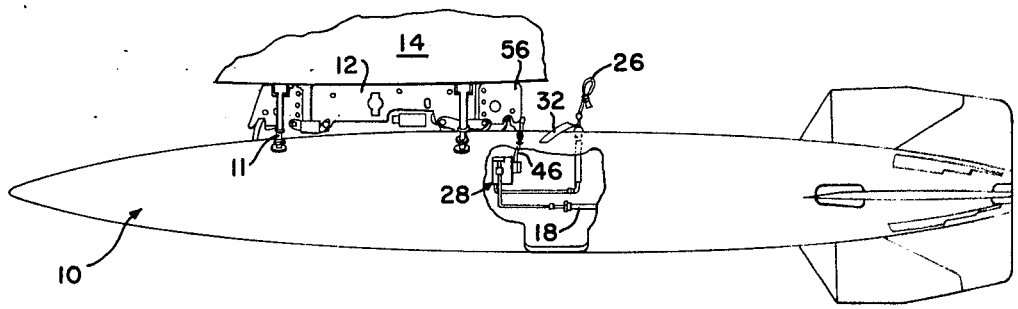
FIG. 1 is a side elevation view of the armament device partly in section, attached to the bomb rack of a launching aircraft.
Figure 2:
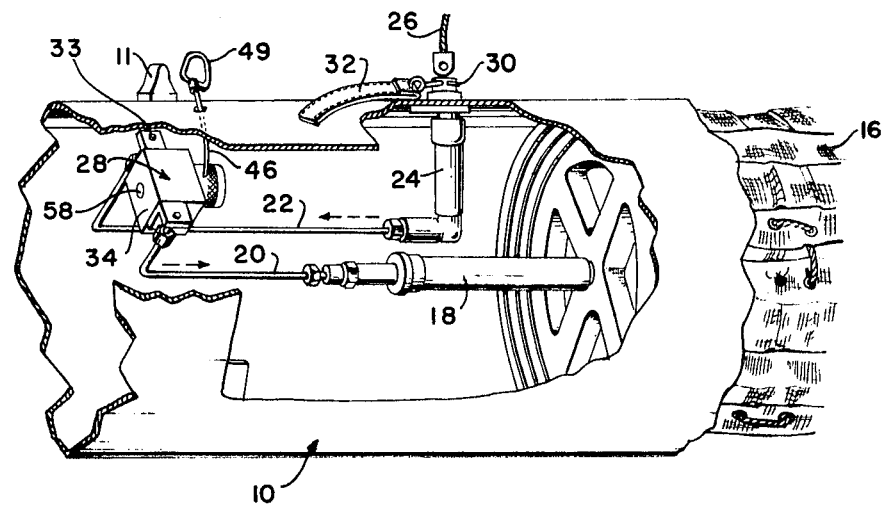
FIG. 2 is an enlarged sectional view in perspective of a portion of FIG. 1 showing the arrangement of the various components.

Referring to the drawing where like reference numerals refer to similar parts throughout the figures there is shown in FIG. 1 a free fall armament device, such as a practice bomb 10, detachably connected by lugs 11 to a bomb rack 12 which in turn is supported to an under portion of a launching aircraft 14, the latter being only partially illustrated. An aft portion of bomb 10 houses a parachute 16, shown in a packed condition in FIG. 2.

Parachute 16 is ejected from the bomb, for deployment under prescribed conditions at the pilot's option, by a conventional ejection cartridge 18 that is connected by piping 20 and 22 from an initiator cartridge 24. Initiator cartridge 24 when initiated by the pilot through a firing cable 26 produces a gas of approximately 3,200 p.s.i. which is routed to ejection cartridge 18 through a safety valve 28 via pipes 20 and 22. Safety valve 28 will be described below in detail. A safety pull pin 30 is provided to lock the initiator cartridge in an inactive condition, i.e., when the aircraft is in a parked status. The pull pin is provided with a safety lanyard 32 which is pulled by the ground crew to unlock the actuator when the aircraft is readied for flight.

Figure 3:
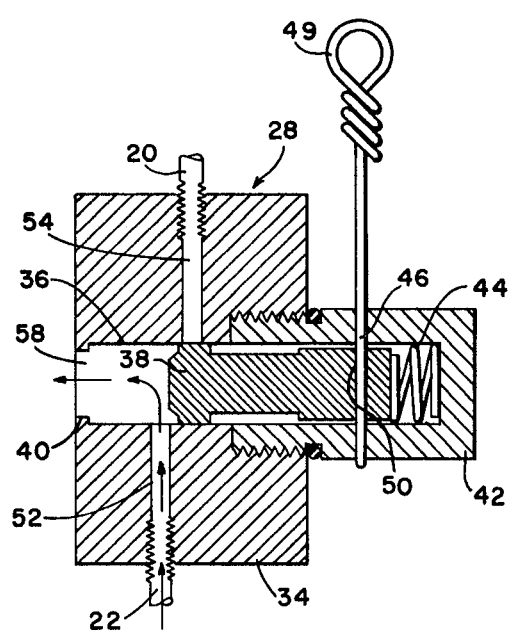
FIGS. 3 and 4 are enlarged elevational sectional views of the safety valve in SAFE and ARMED positioned, respectively.
Figure 4:
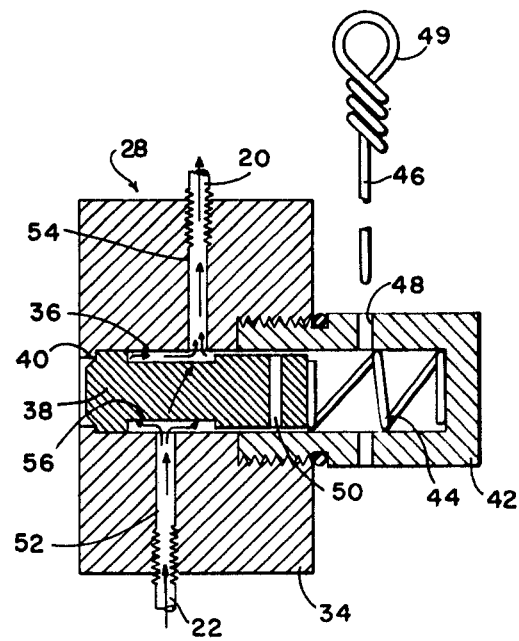
Figure 5:
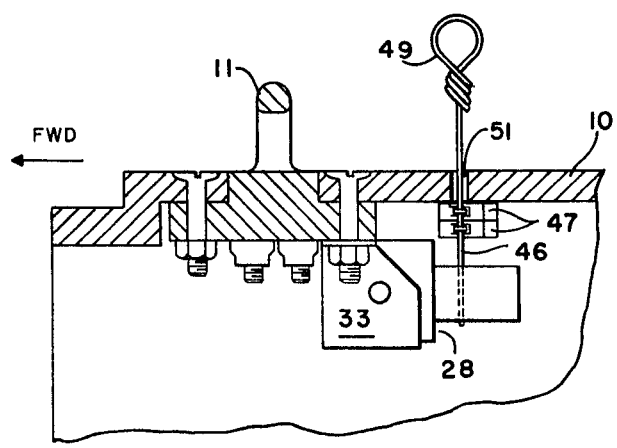
FIG. 5 is a side elevation view of the safety valve showing the details of mounting the arming wire.

The details of safety valve 28 are illustrated in FIGS. 3–5. Valve 28 is supported to the inner skin of bomb 10 by a bracket 33 (FIG. 5). A valve block 34 has a longitudinally drilled opening 36 in which slides a valve plunger 38, preferably made of stainless steel. Plunger 38 is constrained in movement between a stop 40, formed by providing a relief at one end of the opening 36 and a well body 42 threadedly connected to the other end of valve body and aligned with opening 36. Well body 42 houses a compression coil spring 44 biased to propel plunger 38 in a direction to engage stop 40 wherein the plunger is in an ARMED position (FIG. 4). Plunger 38 is secured in a SAFE position (FIG. 3), spring 44 being fully compressed, by an arming wire 46 a free end of which acts like a pin to extend through transverse aligned openings 48 and 50 in the well body and plunger, respectively. Arming wire 46 is provided at the other end by a loop 49 for actuation in a manner to be described.

As shown in FIG. 5, arming wire 46 is supported by one or more "Fahnestock" clips 47 to ensure that there will be sufficient friction to provide a tension on the wire for purposes later to be described. Arming wire extends to outside the bomb casing through a drilled opening 51.

Valve body 34 is provided with two transversely drilled gas ports leading to the valve body opening 36, namely a gas inlet port 52 and an oppositely positioned gas outlet port 54 which ports are connected to tubing 22 and 20, respectively. Valve plunger 38 is fabricated with a reduced annular port 56 intermediate its ends designed to connect ports 52 and 54 when the safety valve is in ARMED position (FIG. 4).

The valve body is also provided with a vent port 58, being the open end of opening 36, for venting the gas in port 52 to atmosphere when the safety valve is in a SAFE position (FIG. 3), in which position valve plunger blocks outlet port 54 and prevents passage of the gas from pipe 22 to pipe 20 to actuate parachute ejection cartridge 18. Arming wire 46, which controls the two positions (SAFE and ARMED) of safety valve 28, is connected to an arming solenoid 56 mounted on bomb rack 12.

Figure 6:
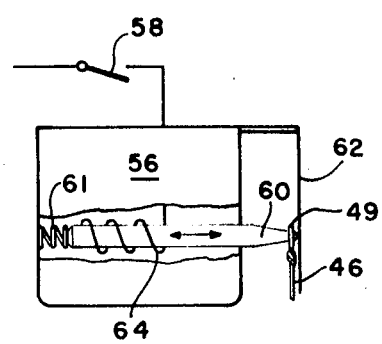
FIG. 6 is an electrical circuit for the arming solenoid being illustrated, in a de-energized condition, showing the means for releasibly connecting the arming wire.

Solenoid 56 is energized by the pilot in the cockpit through an arming switch 58 as shown in the circuit of FIG. 6. Solenoid plunger 60 is threaded through ring portion 49 of the arming wire, the plunger bearing against side plate 62 under the action of compression spring 61. Side plate 62 is supported by and extends downward along the solenoid case and is spaced therefrom to accommodate ring 49. The movement of solenoid plunger 60 is controlled by a solenoid coil 64 connected in series with arming switch 58 and energized by a 28 v. power source in the aircraft. When switch 58 is open, the circuit to coil 64 is broken and ring 49 is capable of being pulled downwardly to separate from plunger 60 by tension on arming wire 46 through clips 47. As solenoid coil 64 is de-energized (FIG. 6), the plunger 60 is free to move laterally against spring 61 to permit separation of the ring which is free to travel with bomb 10. When arming switch 58 is closed by the pilot, coil 64 is energized, and plunger 60 cannot be moved laterally by ring 48 away from plate 62. Thus, ring 48 is locked to the solenoid causing arming wire 46 to be withdrawn from safety valve 28. The consequences of this action will be described under "operation."

It is important that the length of arming wire 46 to be of sufficient length to ensure that safety valve 28 will be positioned to an ARMED position before firing cable 26 actuates initiator cartridge 24.

OPERATION

Assuming that practice bomb 10 is properly loaded on bomb rack 12 and safety lanyard 32 has been removed to unlock firing cable 26 by the ground crew, the operation is as follows. While the aircraft is in flight and when the decision is made by the pilot to drop the practice bomb, he has the option to deploy the parachute. If the parachute is to be deployed, the pilot energizes arming solenoid 56 by closing arming switch 58 (FIG. 6) on his armament panel in the cockpit. The power circuit to solenoid 56 is energized and solenoid plunger 60 is electromagnetically locked in position by coil 64 to restrain ring 49 of the arming wire. When the bomb is dropped, arming wire 46, being shorter than firing cable 26, is first to function and is pulled out of valve body 42 from the SAFE position in FIG. 3 and valve plunger 38 under the action of spring 44 is actuated to the ARMED position in FIG. 4. After safety valve 28 is thus ARMED, firing cable 26 subsequently actuates initiator cartridge 24 and the gas is ported via pipe 22 through safety valve 28 and pipe 20 to ejection cartridge 18 and the parachute is deployed.

If practice bomb 10 is to be dropped without parachute deployment, or if the bomb should accidentally be dropped from the rack, arming switch 58 will remain open and coil 64 remains de-energized. Under these conditions, the tension on arming wire 46 by the falling bomb will cause arming wire loop to pull away from the solenoid by displacing plunger 60 against spring 61. The judicious selection of the proper number of "Fahnestock" clips 47 (FIG. 5) will ensure that arming wire 46 will pull out of solenoid 56 instead of valve 28. As arming wire 46 stays connected to the safety valve, the valve will remain in a SAFE condition. Under these conditions when firing cable 26 actuates initiator cartridge 24, the gas pressure in pipe 22 is routed to safety valve 28 and in the SAFE position (FIG. 3) the gas pressure is vented safely to atmosphere through port 58.

The identical operation as described immediately above occurs should the aircraft be parked and the firing cable is pulled accidentally or mischieviously.

The invention thus provides an armament system with a safety device which prevents damage to personnel and equipment, and which can be incorporated in existing systems without a major redesign.

Obviously many modifications and variations of the present invention are possible in the light of the above teachings. It is therefore to be understood that within the scope of the appended claims the invention may be practiced otherwise than as specifically described.

What is claimed is:

1. In an armament system for a launching aircraft including:
   a launcher;
   an armament device detachably connected to said launcher;
   said armament device having a parachute;
   a gas initiator device;
   parachute ejection means operable by said initiator device;
   a safety device connected between said initiator and the ejection means;
   said safety device being a two-position relief valve, a SAFE position of said valve venting the gas to atmosphere, and an ARM position of the valve directing the gas under pressure to actuate the ejection means; and
   means for actuating said valve from the SAFE position to the ARM position.

2. The armament system of claim 1 wherein:
   said safety valve is spring-loaded to the ARM position;
   means for restraining said valve to the SAFE position against the action of the spring; and
   means for releasing said restraining means.

3. The armament system of claim 2 wherein:
   said restraining means is a pin; and
   said releasing means is a lanyard operable by a firing solenoid energizing by a firing switch in the aircraft cockpit.

4. The armament system of claim 3 wherein said initiator is operable by a firing cable connected to the launcher, the length of both the lanyard and the firing cable being selected to position the safety valve to an ARM position prior to operation of the initiator.

References Cited

UNITED STATES PATENTS

| | | | |
|---|---|---|---|
| 1,988,446 | 1/1935 | Fischer | 102—35.6 |
| 2,945,439 | 7/1960 | Bilinski | 102—4 |
| 3,299,810 | 1/1967 | Robert | 102—4 |
| 3,228,634 | 1/1966 | Chakoian et al. | 102—4 X |
| 3,492,911 | 2/1970 | Adams | 102—4 |

SAMUEL W. ENGLE, Primary Examiner

U.S. Cl. X.R.

102—4, 35.6